(No Model.) 2 Sheets—Sheet 1.
H. BAUMOTTE.
MANUFACTURE OF STONE DRESSING TOOLS.
No. 465,748. Patented Dec. 22, 1891.
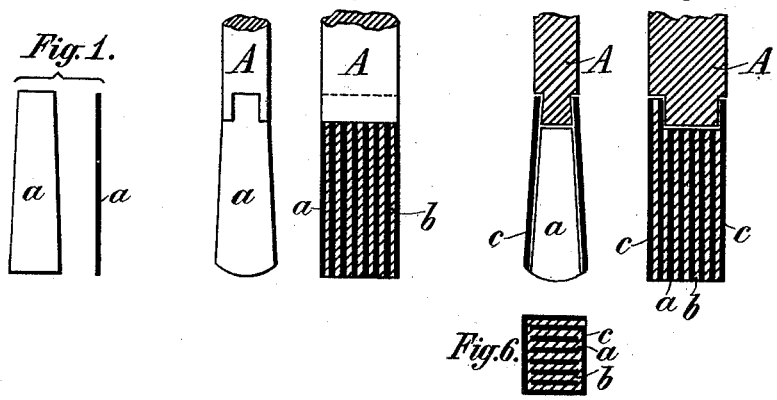
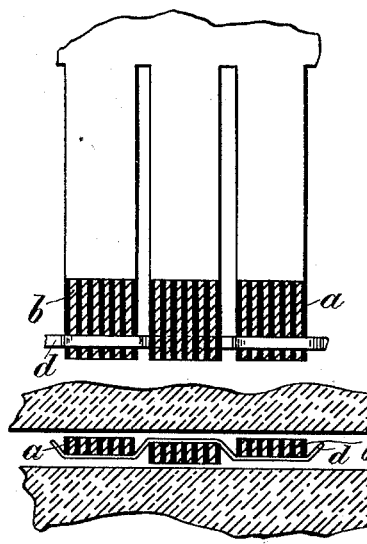
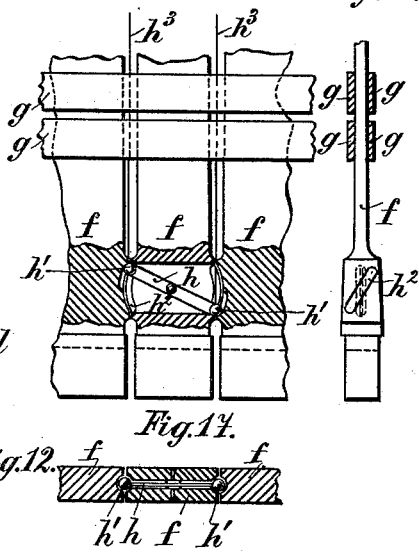
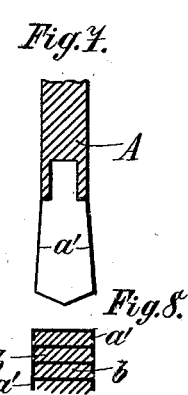
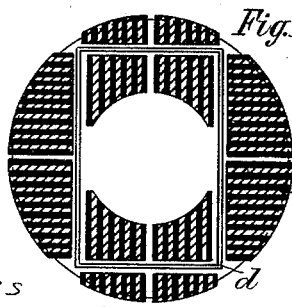
Witnesses
E. E. Duffy
C. W. Werle
Inventor
Hermann Baumotte
per O. E. Duffy
Attorney (No Model.) 2 Sheets—Sheet 2.
H. BAUMOTTE.
MANUFACTURE OF STONE DRESSING TOOLS.
No. 465,748. Patented Dec. 22, 1891.
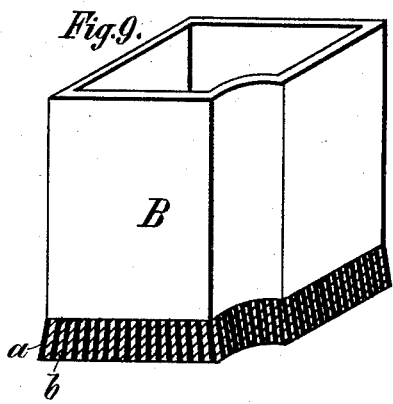
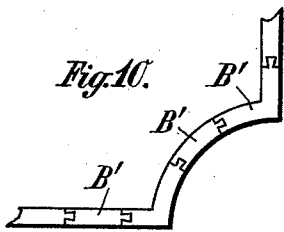
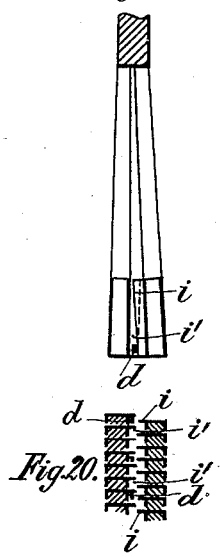
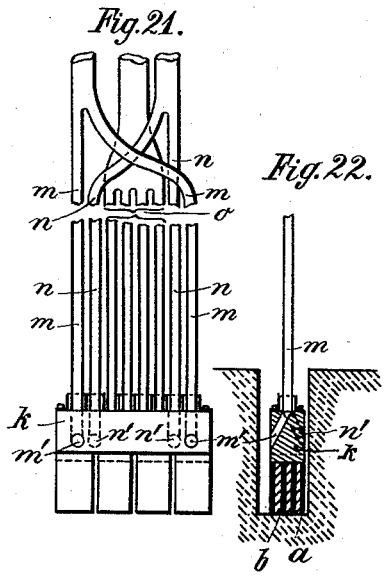
Witnesses
E. C. Duffy
C. M. Werlé
Inventor
Hermann Baumotte
per O. E. Duffy
Attorney

UNITED STATES PATENT OFFICE.

HERMANN BAUMOTTE, OF SCUGSCHEIDERBERG, GERMANY.

MANUFACTURE OF STONE-DRESSING TOOLS.

SPECIFICATION forming part of Letters Patent No. 465,748, dated December 22, 1891.

Application filed May 11, 1891. Serial No. 392,333. (No model.)

*To all whom it may concern:*

Be it known that I, HERMANN BAUMOTTE, a subject of the King of Prussia, residing at Scugscheiderberg, Prussia, Germany, have invented certain new and useful Improvements in Manufacture of Tools for the Dressing of Stone, &c., of which the following is a specification.

This invention relates to the manufacture of tools for the dressing of stone, these tools being made of thin (tempered) steel plates. The small steel plates are as thin over their entire length as the pointed or sharpened end of the tools hitherto used for dressing stone. The thickness of the small steel plates is only about one-fifth of a millimeter and even less, so that the sharpening of tools becomes accordingly superfluous, the small plates being as thin as the cutting-edges of former tools. For dressing stone I make the tool in such a manner as to connect as a whole several tempered steel plates of a thickness of about one-fifth of a millimeter, alternating with soft metal or other material. Between each two such metal plates I place an equally thin brass plate, and the bundle so obtained is soldered together with tin and fixed to a handle or other suitable holder.

In the accompanying drawings, Figure 1 shows one of the thin metal plates $a$. Figs. 2 and 3 show two side views of the complete tool.

An alternative row of steel plates $a$ and of brass plates $b$ are connected together by means of solder into a firm piece, which I call a "tooth," and which is fixed in the handle or holder A. This tooth is very blunt at the beginning; but as it is working the soft brass plates wear very quick when the hard edges of the small steel plates reach the lower edge of the tooth and act as projecting sharp edges, which operate like the cutting-edge of a chisel. Hence the tooth of the tool becomes sharp by use—*i. e.*, the sharpness is obtained by use.

Instead of brass plates, another soft substance like paper may be used as an intermediate layer for the small steel plates. When such paper sheets are used, they must be a little smaller than the steel plates, so that the tin may connect the edges of the steel plates together.

The tooth is preferably made to assume a conical form; but it can also be arranged in such a manner as to inclose the bundle of steel and soft-metal plates in a casing $c$, as shown in Figs. 4, 5, and 6. The said steel plates may also be bent over on their longitudinal edge $a'$, as shown in Figs. 7 and 8, so as to have a U-shaped cross-section, the space between the bent-up longitudinal edges being lined or filled with soft material. The tooth prepared in this manner is soldered with tin in order to bind the steel plates together. The small steel plates may in all cases be highly tempered and even reach the degree of tempering of files, and hence it wears out very little when used, which enables the hardest stone to be dressed. It may be remarked while on this subject that in this case the soldering by means of tin has no influence on the temper of the steel plates, as many experiments have conclusively demonstrated.

If a deeper groove or break than usual is required to be cut in the stone, a row of teeth are fixed—one behind the other—at the lower edge of a metal plate and move perpendicularly up and down in lateral guides while bearing upon the stone. Repeated blows cause a groove or break to be formed in the stone, by means of which the latter is finally divided in two parts, each of which has a plain surface. Water is plentifully supplied to the teeth in order to remove the stony dust or powder produced.

To prepare shaped stones I fix the teeth to the lower edge of a frame of corresponding form B, Fig. 9, which is composed, as shown in Fig. 10, of separate flat iron pieces B', connected together by grooves and tongues, and subsequently soldered with tin. The frame is moved up and down in suitable guides, and hence bears upon the stone.

With the various forms of tool above described grooves, rabbets, breaks, or seams can be cut to a limited depth, because the teeth must be formed with a conical shape, so that as the tooth wears the seam breaks or groove becomes narrower, and there is no further room for a new tooth. In order therefore to obtain grooves, breaks, or seams of unlimited depth, the tool is arranged in the following manner: I arrange the teeth at the lower edge of the plate, or of the shell, or other holder, no more in a closed row, but at intervals, as shown in Figs. 11 and 12. The lower end of the holder is furnished up to a certain height with notches corresponding with the intervals between the teeth.

Between the lower ends of the teeth is clamped a piece $d$, (a wire or the like,) which separates the teeth from one another, Figs. 12 and 13, so that the groove or break to be formed has a corresponding width to that of the teeth. Owing to the elasticity of the split holder, the clamped or locking piece is firmly held and is forced upward according as the teeth wear when the latter are hammered on the stone. This locking-piece presses the teeth uniformly apart toward both sides, and hence the groove, cut, or break remains uniform and is not narrowed. The tool should, however, be also moved toward the sides in order to meet the parts of the stone which are between the teeth. In a similar manner the outer teeth of a tool, Figs. 14 or 15, intended to form circular or disk-shaped recesses may be pushed apart from one another by a locking-piece $d$. I may, however, in case of depth, arrange the tool in the manner shown in Figs. 16, 17, and 18. In this case the slots of the plate or of the shell or other holder of the teeth extend from the bottom to the top, so that the holder consists of separate strips $f$, which are connected together by means of cross-bars $g$. The teeth are fixed to the lower ends of the strips $f$, each second strip of which is furnished immediately above the tooth with a transverse slot, in which a lever $h$ is arranged to oscillate and has spherical ends $h'$. The latter engage in slant slots $h^2$, Fig. 18, of the adjoining strips $f$, and are connected with tension-wires $h^3$, leading to the upper end of the holder. If one of the wires $h^3$ is pulled at one end, the spherical ends $h'$ move in the slant slots $h^4$, and thus press the strips laterally apart. According as the teeth are wearing, the spherical ends of the lever $h$ are gradually pulled higher.

When I use, in the making of teeth, small steel plates of U-shaped cross-section, with laterally-projecting ribs, as shown in Figs. 19 and 20, I place two such teeth in close proximity one to the other in such a manner that the lateral ribs $i$ of the one engage within the intervening spaces formed by the ribs of the others. In separate intervals $i'$ I place a locking-piece $d$, which presses the teeth apart and moves upward as the teeth wear. I may finally, as shown in Figs. 21 and 22, fix the teeth in a solid piece $k$, to which are connected a number of flexible tubes. The two outer tubes $m$ lead to the channels $m'$ of the metal piece $k'$ and the two pipes $n'$. The channels $m'$ lead to one and the channels $n'$ to the other side of $k$. The pipes $o$, placed between the pipes $n$, are closed below by the metal piece $k$. The pipes $m, n$, and $o$ are connected at the top to a common pipe. During operations water is allowed to issue, under proper pressure, sometimes through the pipes $m$ and sometimes through the pipes $n$, as desired. When the water runs through the pipes $m$ and $m'$, the metal piece $k$ is forced by the pressure of the water against the right wall of the cut, groove, or break; but if the water runs through the pipes $n$ and $n'$, $k$ is pressed against the left wall, and thus the narrowing of the opening is prevented. The middle pipes $o$ serve to transmit the blow to the metal piece $k$. The pipes $o$ are filled with water or compressed air, so that a blow which is applied upon a piston arranged at the upper end of their common connecting-tube is transmitted by the water or air to the metal piece $k$.

The tool here described works upon the stone by cutting, hacking, or clipping without any frictional sliding movement, and the tool automatically sharpens itself as the sharp particles of the stone clipped or knocked off by abrasion in the form of powder carry away the particles of the soft metal intervening between the steel plates.

Having particularly described and ascertained the nature of my invention and in what manner the same is to be performed, I declare that what I claim is—

A hacking or striking tool for working stone and rock, consisting of a support or carrier and a series of rigidly-held parallel closely-arranged flat hard-metal cutting-plates, each plate being of the thickness of a cutting-edge, interposed brass or other soft-metal plates between and parallel with the cutting-plates, and solder or other fusible metal uniting the cutting and the soft-metal plates into one block or cutting-tooth, substantially as described.

In testimony whereof I have signed my name to this specification in the presence of two subscribing witnesses.

HERMANN BAUMOTTE.

Witnesses:
 AUGUST MÜHLE,
 WLADIMIR ZIOTECKI.